(12) United States Patent
Sugiyama et al.

(10) Patent No.: US 9,277,082 B2
(45) Date of Patent: Mar. 1, 2016

(54) IMAGE READING APPARATUS

(71) Applicant: CANON KABUSHIKI KAISHA, Tokyo (JP)

(72) Inventors: Takayuki Sugiyama, Utsunomiya (JP); Narumasa Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/573,179

(22) Filed: Dec. 17, 2014

(65) Prior Publication Data

US 2015/0207954 A1    Jul. 23, 2015

(30) Foreign Application Priority Data

Jan. 17, 2014  (JP) ................. 2014-006928

(51) Int. Cl.
*H04N 1/04* (2006.01)
*H04N 1/028* (2006.01)
*H04N 1/48* (2006.01)
*H04N 1/10* (2006.01)

(52) U.S. Cl.
CPC ......... *H04N 1/02895* (2013.01); *H04N 1/0283* (2013.01); *H04N 1/02835* (2013.01); *H04N 1/1017* (2013.01); *H04N 1/488* (2013.01)

(58) Field of Classification Search
CPC ................ H04N 1/02815; H04N 2201/03125; H04N 2201/03141; H04N 2201/0081; H04N 2201/02462; H04N 2201/03112; F21V 13/02; F21V 13/04; F21V 13/08; F21V 13/12; F21V 21/00; F21V 5/04; F21V 7/005

USPC .......... 358/475, 474, 482, 448, 483; 362/616, 362/623, 217.05, 223, 235; 250/208.1, 250/227.11, 458.1, 578.1; 382/275; 399/168, 388, 45
See application file for complete search history.

(56) References Cited

U.S. PATENT DOCUMENTS

| | | | | |
|---|---|---|---|---|
| 6,232,592 B1* | 5/2001 | Sugiyama | ................. | 250/227.11 |
| 6,360,030 B1* | 3/2002 | Kawai et al. | ................. | 382/312 |
| 7,213,929 B2* | 5/2007 | Imade | ................. | 353/102 |
| 7,538,912 B2* | 5/2009 | Sawada | ................. | 358/483 |
| 8,297,824 B2* | 10/2012 | Saito et al. | ................. | 362/607 |
| 8,469,575 B2* | 6/2013 | Weber et al. | ................. | 362/609 |

(Continued)

FOREIGN PATENT DOCUMENTS

JP    H10-190962 A    7/1998

*Primary Examiner* — Negussie Worku
(74) *Attorney, Agent, or Firm* — Carter, DeLuca, Farrell & Schmidt, LLP

(57) ABSTRACT

Provided is an image reading apparatus that can inhibit occurrence of a bright spot line image due to microstructures of a light guide. An image reading apparatus satisfies: $45-\phi \leq \theta \leq \phi - \omega/n$ ($0 \leq \omega \leq \omega_{max}$); and $45-\phi \leq \theta \leq \phi$ ($-\omega_{max} \leq \omega \leq 0$), where $\theta$ is an angle (deg.) between a surface of original and a reflecting surface of a microstructure reflection surface of a light guide, $\omega$ is a half angle of view (deg.) of an imaging forming lens, $\omega_{max}$ ($\omega_{max} > 0$) is a maximum value (deg.) of the half angle of view of the imaging forming lens on an LED light source side with respect to a reading optical axis of the imaging lens, $-\omega_{max}$ is a maximum value (deg.) of the half angle of view of the imaging lens on a side opposite to the LED light source with respect to the reading optical axis, n is a refractive index of the light guide, and $\phi = \sin^{-1}(1/n)$.

14 Claims, 13 Drawing Sheets

(56) References Cited

U.S. PATENT DOCUMENTS

| | | | | |
|---|---|---|---|---|
| 8,605,057 B2* | 12/2013 | Yang | | 345/175 |
| 8,780,300 B2* | 7/2014 | Niioka et al. | | 349/66 |
| 8,964,111 B2* | 2/2015 | Nakahara | | 348/371 |
| 2012/0154877 A1* | 6/2012 | Kisara et al. | | 358/474 |
| 2013/0250614 A1* | 9/2013 | Thompson et al. | | 362/608 |
| 2014/0014819 A1* | 1/2014 | Yoshida | | 250/208.1 |
| 2014/0092442 A1* | 4/2014 | Ooyanagi | | 358/3.06 |
| 2014/0139893 A1* | 5/2014 | Sugiyama et al. | | 358/475 |
| 2015/0062670 A1* | 3/2015 | Yoshida et al. | | 358/482 |
| 2015/0189117 A1* | 7/2015 | Okamoto | | 358/474 |

\* cited by examiner

IMAGE READING APPARATUS

CROSS REFERENCE TO RELATED APPLICATIONS

This application claims the benefit of Japanese Patent Application No. 2014-006928, filed Jan. 17, 2014, which is hereby incorporated by reference herein in its entirety.

BACKGROUND OF THE INVENTION

1. Field of the Invention

The present invention relates to an image reading apparatus. More particularly, the present invention is suitable for an image reading apparatus such as an image scanner, a copying machine, a facsimile machine, or the like.

2. Description of the Related Art

In an image reading apparatus configured to illuminate a surface of original to read an image thereon by a line sequential system, an illuminating device using a light emitting diode (LED) as a light source is hitherto used. Japanese Patent Application Laid-Open No. H10-190962 discloses an illuminating device of an edge lit type in which an LED is provided at an edge in a longitudinal direction of a light guide and a light flux is reflected in the light guide to be guided to an original. Further, in recent years, a structure is known in which, in order to realize higher quality of an image read by an image reading apparatus, a reduction optical system having a deep depth of field is adopted to enhance light collecting efficiency in a section perpendicular to the longitudinal direction of the light guide.

However, when a reduction optical system is applied to the structure disclosed in Japanese Patent Application Laid-Open No. H10-190962, a light flux that is regularly reflected by the surface of original is collected on a sensor through the reduction optical system, and a bright spot appears in a read image.

SUMMARY OF THE INVENTION

Accordingly, an object of the present invention is to provide an image reading apparatus that can inhibit occurrence of a bright spot due to regularly reflected light from a surface of original and can obtain a high quality read image.

In view of this, according to one embodiment of the present invention, there is provided an image reading apparatus, including: an illumination unit including a light source and a light guide for guiding a light flux from the light source to a surface of original, the light guide being elongated in a first direction; and an imaging unit for collecting a light flux from the surface of original, in which the light guide includes: an incident surface provided on an end surface in the first direction, the light flux from the light source entering the incident surface; an exit surface from which a light flux from the incident surface exits, the exit surface being elongated in the first direction; and a light guide surface opposed to the exit surface, for guiding the light flux from the incident surface to the exit surface, and in which the light guide surface includes a plurality of prisms each having a reflecting surface opposed to the incident surface. In the image reading apparatus, the following conditions are satisfied: $45-\phi \le \theta \le \phi - \omega/n$ ($0 \le \omega \le \omega_{max}$); and $45-\phi \le \theta \le \phi$ ($-\omega_{max} \le \omega \le 0$), where, within a section including the first direction and a direction perpendicular to the surface of original, $\theta$ is an angle (deg.) between the surface of original and the reflecting surface, $\omega$ is a half angle of view (deg.) of the imaging unit, $\omega_{max}$ is a maximum value (deg.) of the half angle of view of the imaging unit on the light source side with respect to a reading optical axis of the imaging unit, $-\omega_{max}$ is a maximum value (deg.) of the half angle of view of the imaging unit on a side opposite to the light source with respect to the reading optical axis, and n is a refractive index of the light guide (provided that $\phi = \sin^{-1}(1/n)$).

Further features of the present invention will become apparent from the following description of exemplary embodiments with reference to the attached drawings.

DESCRIPTION OF THE EMBODIMENTS

An image reading apparatus according to the present invention is described in the following with reference to the attached drawings. Note that, the attached drawings may not be drawn to scale for easy understanding of the present invention.

Figure 23:
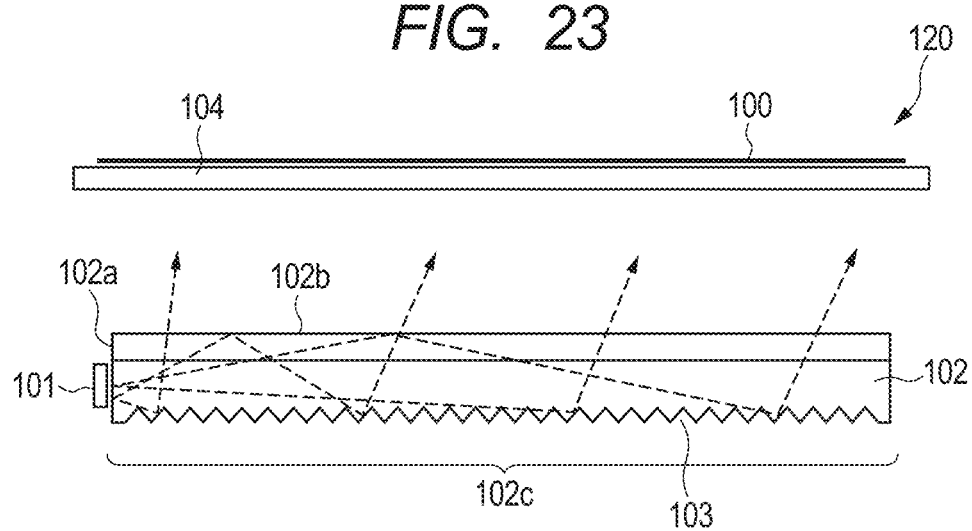
FIG. 23 is a longitudinal sectional view of an illuminating device 120 to which the invention disclosed in Japanese Patent Application Laid-Open No. H10-190962 is applied.
Figure 24:
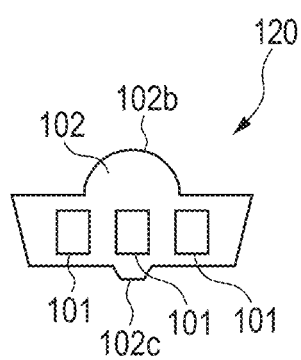
FIG. 24 is a scanning sectional view of the illuminating device 120 to which the invention disclosed in Japanese Patent Application Laid-Open No. H10-190962 is applied.

FIG. 23 and FIG. 24 are a longitudinal sectional view and a scanning sectional view, respectively, of an illuminating device 120 to which the invention disclosed in Japanese Patent Application Laid-Open No. H10-190962 is applied. Note that, a longitudinal direction as used herein means a longitudinal direction of a light guide, a longitudinal section as used herein means a section including the longitudinal direction of the light guide and a reading optical axis, and a scanning section as used herein means a section including the scanning direction of the image reading apparatus and the reading optical axis.

As illustrated in FIG. 23, an LED 101 as a light source is provided at an end in the longitudinal direction of the illuminating device 120. A light guide 102 is provided adjacent to the LED 101 so as to extend in the longitudinal direction.

An incident surface 102a of the light guide 102 is provided so as to be opposed to the LED 101. A microstructure reflection surface 102c on which a plurality of microstructures 103 are arranged at appropriate intervals in the longitudinal direction is provided at the bottom of the light guide 102 on a side opposed (opposite) to an exit surface 102b provided on an upper surface of the light guide 102.

Further, an original table glass 104 for placing an original 100 thereon is provided above the light guide 102.

When the LED 101 is lit, a light flux emitted from the LED 101 enters the inside of the light guide 102 from the incident surface 102a of the light guide 102. By being totally reflected at least once by an interface of the light guide 102, the light flux travels in the longitudinal direction. A part of the light flux is, during the travel in the longitudinal direction, reflected by the microstructures 103, exits from the exit surface 102b of the light guide 102 toward the original table glass 104, and is radiated to the original 100 placed on the original table glass 104.

In the illuminating device 120 disclosed in Japanese Patent Application Laid-Open No. H10-190962, as illustrated in FIG. 24, an appropriate shape of the exit surface 102b of the light guide 102 enhances light collecting efficiency.

Figure 25:
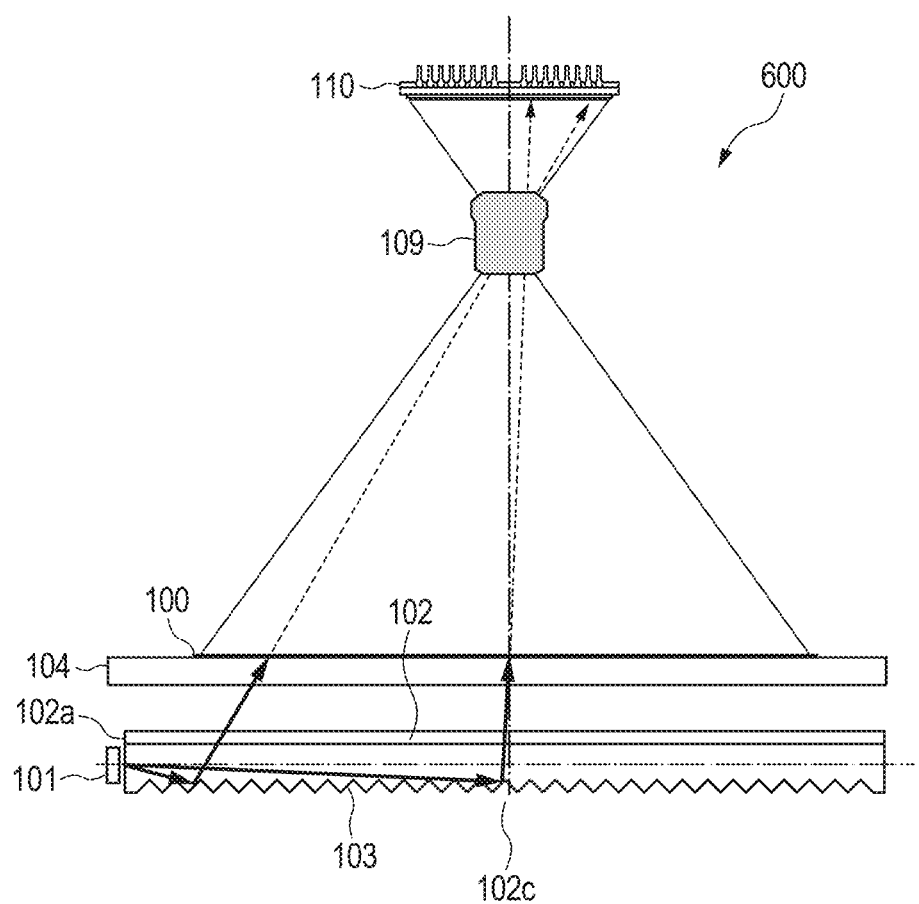
FIG. 25 is a developed view of optical paths in an image reading apparatus 600 having the illuminating device 120 mounted thereon.

FIG. 25 is a developed view of optical paths in an image reading apparatus 600 having the illuminating device 120 mounted thereon.

When the original 100 placed on the original table glass 104 is an original having a smooth surface and having a regular reflection characteristic such as a metal, a part of the light flux reflected by the microstructures 103 of the light guide 102 is, after entering the original 100, regularly reflected. Then, the regularly reflected light flux passes through a pupil of an imaging lens 109 that is a reduction optical system, and forms an image on a line sensor 110 as a reading unit.

Therefore, a bright spot line image due to the microstructures of the light guide is overlaid on a read image based on image information of the read original, and thus a high quality read image cannot be obtained.

Figure 1:
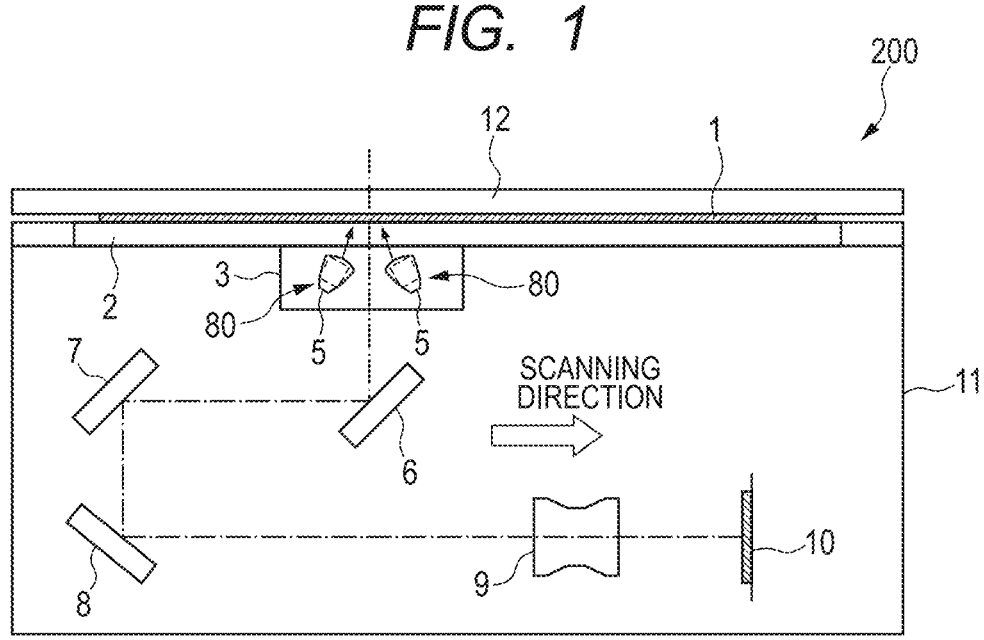
FIG. 1 is a schematic scanning sectional view of an image reading apparatus 200 having an illuminating device 3 mounted thereon according to a first embodiment of the present invention.

FIG. 1 is a schematic scanning sectional view of an image reading apparatus 200 having an illuminating device 3 mounted thereon according to a first embodiment of the present invention.

The image reading apparatus 200 includes an original table glass 2, the illuminating device (illumination unit) 3, a first reflection mirror 6, a second reflection mirror 7, and a third reflection mirror 8. Further, the image reading apparatus 200 includes an imaging lens (imaging unit) 9, a line sensor 10 as a light receiving unit, a main body 11 in which the respective components are arranged, and a platen 12.

An original (read original) 1 is placed on the original table glass 2. The illuminating device 3 illuminates the original 1 with a light flux that exits from a light guide 5 provided therein. The first reflection mirror 6, the second reflection mirror 7, and the third reflection mirror 8 each fold an optical path in the main body 11 by reflecting the light flux reflected by the original 1. The imaging lens 9 forms an image on a surface of the line sensor 10 using the light flux based on the image information of the original 1.

The light flux that exits from the illuminating device 3 illuminates the original 1. The light flux reflected by the original 1 is reflected by the reflection mirrors 6 to 8, the optical paths thereof are folded in the main body 11, and an image on a surface of the original 1 is formed by the imaging lens 9 on the surface of the line sensor 10.

While the first reflection mirror 6, the second reflection mirror 7, and the third reflection mirror 8 move in the scanning direction, the image information of the original 1 is read by the line sensor 10. Actually, through electrical scanning and reading by respective light receiving elements in the line sensor 10, the image information in the longitudinal direction of the light guide 5 is read. A moving amount in the scanning direction of each of the second reflection mirror 7 and the third reflection mirror 8 is half a moving amount in the scanning direction of the first reflection mirror 6. Specifically, by moving the reflection mirror 6 and the reflection mirrors 7 and 8 with a ratio of the moving amounts being 2:1, a distance between the original 1 and the line sensor 10 (optical path length) is fixed.

Next, the imaging lens 9 is described. The imaging lens 9 forms an image using the light flux based on the image information of the original 1 with an imaging magnification β that is determined by a pixel pitch of the line sensor 10 and a resolution necessary for the reading.

In the present embodiment, the resolution necessary for the reading is 600 dpi and the pixel pitch of the line sensor 10 is 4.7 μm. Thus, the imaging magnification β is determined to be −0.111.

Further, a maximum object height Y necessary for reading an A3 sized original is 152.5 mm. A focal length f of the imaging lens 9 for satisfying a size and imaging performance of the image reading apparatus is 46.7 mm.

A most off-axis half angle of view $\omega_{max}$ of the imaging lens 9 is determined from a relationship:

$$\omega_{max} = \tan^{-1}(Y/((1-(1/\beta))\times f))$$

to be:

$$\tan^{-1}(152.5/((1-(1/(-0.111)))\times 46.7)) = 18.1°.$$

Figure 2:
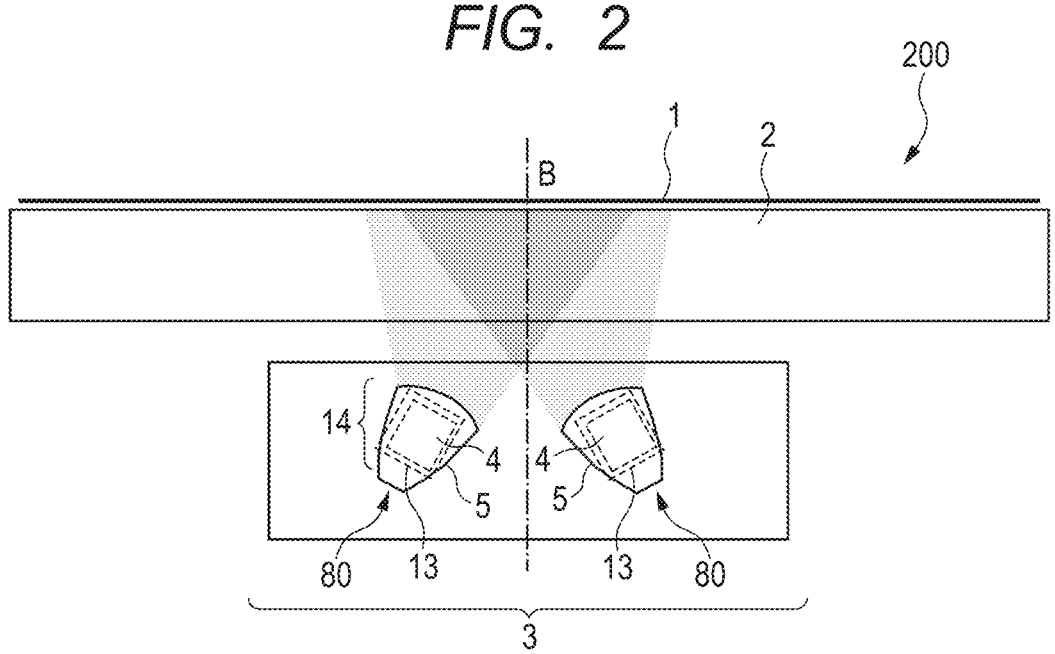
FIG. 2 is a partial enlarged scanning sectional view of the image reading apparatus 200 having the illuminating device 3 mounted thereon according to the first embodiment of the present invention.

FIG. 2 is a partial enlarged scanning sectional view of the image reading apparatus 200 having the illuminating device 3 mounted thereon according to the first embodiment.

The illuminating device 3 includes two illuminating units 80 each including light source units 14 that each include a substrate 13 and a white LED light source 4 as a light emitting element provided thereon, and the light guide 5. The two illuminating units 80 are arranged so as to be symmetrical with respect to a reading optical axis B of the original 1 so that a surface of original of the original 1 is illuminated from both sides of the reading optical axis B in the scanning direction.

Next, the illuminating unit 80 constructing the illuminating device 3 is described with reference to FIG. 3 to FIG. 5.

Figure 3:
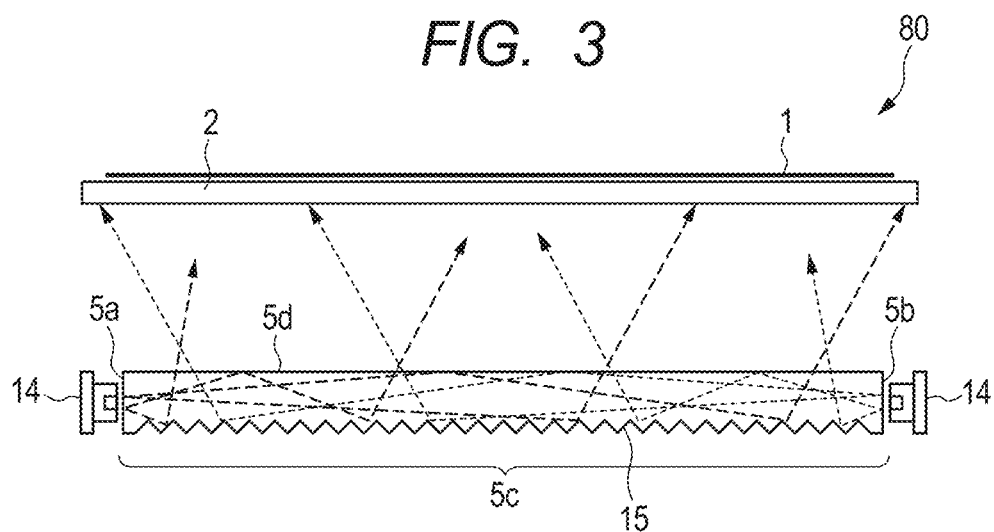
FIG. 3 is a longitudinal sectional view of an illuminating unit 80.

FIG. 3 is a longitudinal sectional view of the illuminating unit 80. FIG. 4 is a scanning sectional view of the illuminating unit 80. FIG. 5 is a perspective view illustrating a microstructure reflection surface (light guide surface) 5c of the light guide 5.

Figure 4:
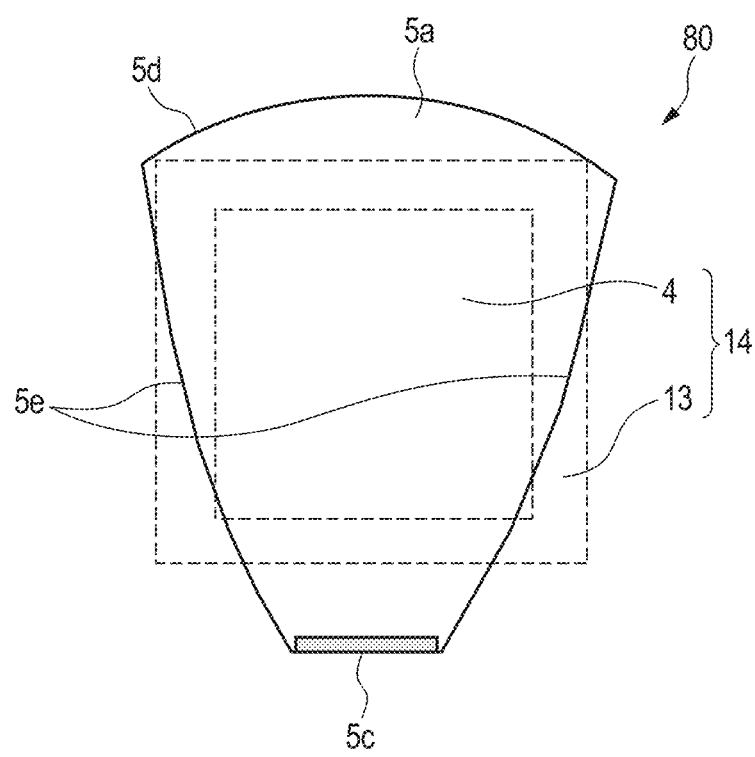
FIG. 4 is a scanning sectional view of the illuminating unit 80.

As illustrated in FIG. 3 and FIG. 4, the light guide 5 that extends in the longitudinal direction (first direction) includes incident surfaces 5a and 5b on end surfaces on both sides, respectively, in the longitudinal direction, and the microstructure reflection surface 5c having microstructures 15 formed inside a bottom surface in the longitudinal direction of the light guide 5. Further, the light guide 5 includes an exit surface 5d that is provided on an upper surface as a location opposed to the microstructure reflection surface 5c and that is opposed to (preferably in parallel with) the original 1, and total reflection side surfaces 5e that extend in the longitudinal direction between the exit surface 5d and the microstructure reflection surface 5c. The light source units 14 are provided so as to be adjacent to the incident surfaces 5a and 5b, respectively, of the light guide 5.

The light flux that exits from the light source unit 14 enters the inside of the light guide 5 from the incident surfaces 5a and 5b, and the light flux totally reflected by the exit surface 5d and the total reflection side surfaces 5e propagates in the light guide 5 in the longitudinal direction. A part of the light flux is, during the propagation in the longitudinal direction, reflected by the plurality of microstructures 15 formed on the microstructure reflection surface 5c, and, when not totally reflected by the exit surface 5d, exits from the exit surface 5d toward the original table glass 2 to be radiated to the original 1 placed on the original table glass 2.

Figure 5:
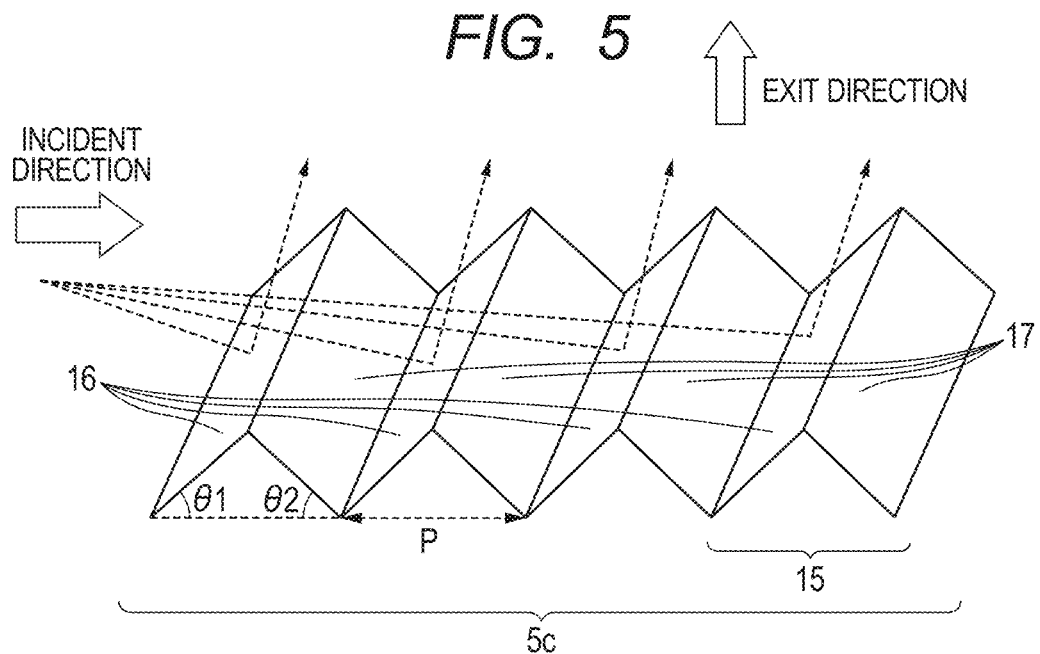
FIG. 5 is a perspective view illustrating a microstructure reflection surface 5c of a light guide 5.

Note that, in FIG. 5, only the light flux that enters from the incident surface 5a, reflected by reflecting surfaces 16, and exits is illustrated as broken lines.

As illustrated in FIG. 4, the light guide 5 is substantially in the shape of a fan in scanning section, and the exit surface 5d is in the shape of a curve having a light collecting effect in scanning section. These shapes cause the light flux to be radiated with directivity from the exit surface 5d toward the original 1, and appropriately illuminates the original 1. Further, the total reflection side surfaces 5e that connect the exit surface 5d and the microstructure reflection surface 5c are in the shape of curved surfaces that are paraboloids or ellipsoids. This is for the purpose of deflecting, toward the original 1 with efficiency, the light flux traveling from the microstructure reflection surface 5c toward the total reflection side surfaces 5e by forming the total reflection side surfaces 5e as paraboloidal reflecting surfaces or ellipsoidal reflecting surfaces under a state in which a midpoint of the microstructure reflection surface 5c is a focal point of the paraboloids or the ellipsoids. This enables securement of an adequate light amount for the original 1 and securement of a stable illuminated region in the scanning direction. The light guide 5 itself is in the shape of the scanning section extended in the longitudinal direction.

Note that, the light guide 5 is a bar-like transparent member, and a material thereof is a glass material or an optical synthetic resin such as a plastic. Note that, it is preferred that the light guide 5 be a transparent member having a refractive index n in a range of from 1.4 to 1.9. In particular, the light guide 5 according to the present embodiment is formed of acrylic as a plastic material on which the microstructures 15 can be formed using a mold, in particular, polymethyl methacrylate (PMMA). The light guide 5 has a length in the longitudinal direction that is enough for illuminating the region to be illuminated of the original 1. In the present embodiment, the length is 350 mm.

As illustrated in FIG. 5, the microstructure reflection surface 5c is formed by coupling the plurality of microstructures 15 in the longitudinal direction. Reflecting surfaces 16 and 17 of each of the microstructures 15, which are provided so as to be opposed to the incident surfaces 5a and 5b, totally reflect a light flux that is incident with an incident angle that is a total reflection angle or larger, and guide the light flux to the exit surface 5d. In the present embodiment, as the microstructure reflection surface 5c, triangular prisms are adopted. However, the microstructure reflection surface 5c is not limited thereto, and may be trapezoidal prisms, polyhedral reflecting surface prisms in which the reflecting surfaces 16 or 17 are each formed of a plurality of planes, or curved reflecting surface prisms in which the reflecting surfaces 16 or 17 have a curvature.

As described above, the microstructure reflection surface 5c of the present embodiment is formed as triangular prisms, and each of the triangular prisms is elongated in the scanning direction.

Further, a pitch P in the longitudinal direction of the microstructures 15 is fixed at any place in the longitudinal direction. Alternatively, in order to make a more appropriate illuminance light amount distribution in the longitudinal direction, the pitch P may be set so as to become smaller as a distance from the light source unit 14 becomes larger. In that case, when there are light sources on both sides, respectively, of the light guide 5 as in the present embodiment, the pitch P in the longitudinal direction of the microstructures 15 is the smallest at the center in the longitudinal direction of the light guide 5.

Next, an incline angle θ of the microstructure reflection surface 5c is described in detail.

Figure 6:
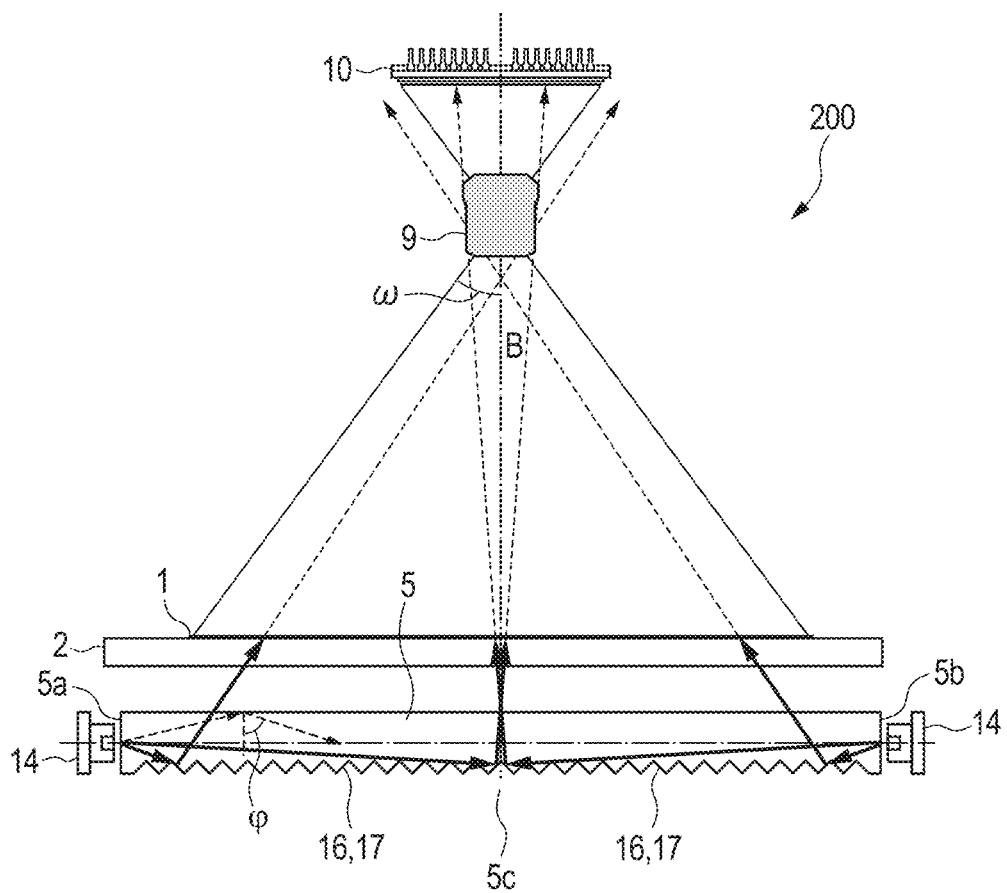
FIG. 6 is a developed view of optical paths in the image reading apparatus 200 according to the first embodiment of the present invention.

FIG. 6 is a developed view of optical paths in the image reading apparatus 200 according to the present embodiment.

When the original 1 placed on the original table glass 2 is an original having a smooth surface and having a regular reflection characteristic such as a metal, in the present embodiment, after a part of the light flux reflected by the microstructures 15 of the light guide 5 irradiates the original 1 and then is regularly reflected by the original 1, the light flux is prevented from passing through a pupil of the imaging lens 9. Under such a condition, incline angles θ1 and θ2 of the reflecting surfaces 16 and the reflecting surfaces 17 of the microstructures 15 of the microstructure reflection surface 5c, which reflect light fluxes that enter from the light guide incident surfaces 5a and 5b and are opposed to the incident surfaces 5a and 5b, respectively, are determined. The incline angle as used herein means an angle between a plane of the original table glass 2 (original 1) and the reflecting surface.

This prevents light regularly reflected by the original 1 from forming an image on the line sensor 10, and thus, occurrence of a bright spot line image due to the microstructures 15 can be inhibited.

Specifically, by setting the incline angles θ1 and θ2 so that the following conditional expressions (1) and (2) are satisfied, the object described above can be attained.

The incline angles θ1 and θ2 are set so as to satisfy the following conditions:

$$45-\phi \leq \theta1 \leq \phi - \omega/n \; (0 \leq \omega \leq \omega_{max})$$

$$45-\phi \leq \theta1 \leq \phi \; (-\omega_{max} \leq \omega \leq 0); \text{ and}$$

$$45-\phi \leq \theta2 \leq \phi + \omega/n \; (-\omega_{max} \leq \omega \leq 0) \quad (1)$$

$$45-\phi \leq \theta2 \leq \phi \; (0 \leq \omega \leq \omega_{max}) \quad (2),$$

where, within a section including the longitudinal direction of the light guide 5 and a direction perpendicular to the surface of the original 1, θ1 is an incline angle (deg.) of the reflecting surface 16, θ2 is an incline angle (deg.) of the reflecting surface 17, ω is a half angle of view (deg.) of the imaging lens 9, and $\omega_{max}$ ($\omega_{max}>0$) is a maximum value (deg.) of the half angle of view of the imaging lens 9 on the side of the light source adjacent to the incident surface 5a with respect to the reading optical axis B of the imaging lens 9. Further, $-\omega_{max}$ is a maximum value (deg.) of the half angle of view of the imaging lens 9 on the side opposite to the light source adjacent to the incident surface 5a with respect to the reading optical axis B, φ is a total reflection angle (deg.) in the light guide 5, and n is a refractive index of the light guide 5. Further, a total reflection angle φ in the light guide 5 is an angle with which, when a light flux propagating in the light guide 5 reaches an interface of the light guide 5, the light flux is totally reflected by the interface and returns to the inside of the light guide 5 without going outside the light guide 5. When the light guide 5 is provided in the air as in the present embodiment, the total reflection angle φ is represented as $\sin^{-1}(1/n)$.

In the present embodiment, as specific values, ω=−18.1° to 18.1°, n=1.49 (acrylic is used), and $\phi=\sin^{-1}(1/1.49)=42.2°$ are used.

As can be seen from the conditional expressions (1) and (2), the incline angles θ1 and θ2 satisfy the same relationship. Thus, in the following description, θ1 and θ2 are collectively represented as θ.

Figure 7:
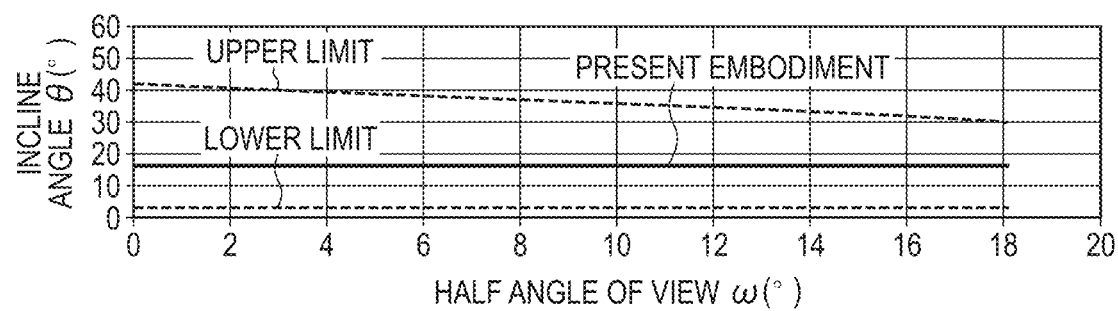
FIG. 7 is a graph showing a relationship between an incline angle $\theta$ and a half angle of view $\omega$ in the first embodiment of the present invention.

FIG. 7 is a graph showing a relationship between the incline angle θ and the half angle of view ω in the present embodiment. Note that, only a case in a range of $0 \leq \omega \leq \omega_{max}$ is shown here.

The half angle of view ω can take values from a most off-axis half angle of view at which one of the light source units 14 is provided with respect to the imaging lens 9 to a most off-axis half angle of view on the opposite side to the light source unit 14 with respect to the reading optical axis B. Specifically, the half angle of view ω can take values in a range of $-\omega_{max} \leq \omega \leq \omega_{max}$.

In the range of $0 \leq \omega \leq \omega_{max}$, a lower limit of the conditional expression (1) is determined as $\theta_{min}=45-42.2=2.8°$. When $\theta<\theta_{min}$, the condition of total reflection in the light guide 5 is satisfied, and thus, the light flux cannot exit from the exit surface 5d.

On the other hand, in the range of $0 \leq \omega \leq \omega_{max}$, an upper limit of the conditional expression (1) is calculated as $\theta_{max}=42.2-(18.1/1.49)=30.0°$ in the case of a most off-axis of $\omega=\omega_{max}=18.1°$, and is calculated as $\theta_{max}=42.2-(0/1.49)=42.2°$ in the case of an on-axis of ω=0°. When $\theta>\theta_{max}$, a regularly reflected light flux comes in the pupil of the imaging lens 9, and thus, a bright spot line image due to the microstructures 15 occurs.

Note that, in the range of $-\omega_{max} \leq \omega \leq 0$, the lower limit does not change and is fixed as $\theta_{min}=2.8°$. On the other hand, in the range of $-\omega_{max} \leq \omega \leq 0$, the upper limit does not change and is fixed as $\theta_{max}=42.2°$ when ω=0°. This is because, if the incline angle θ is larger than $\theta_{max}=\phi=42.2°$, when the light flux enters the reflecting surfaces 16, the light flux is not reflected but is refracted to leak to the outside. Note that, the setting of the incline angle θ in the range of $-\omega_{max} \leq \omega \leq 0$ is similar with regard to other embodiments to be described later, and the incline angle θ is set so as to be in the predetermined range between the lower limit $\theta_{min}$ and the upper limit $\theta_{max}$ when ω=0°.

In FIG. 7, the upper limit and the lower limit described above are shown as broken lines. In the present embodiment, as shown as a solid line in FIG. 7, the incline angle θ is set to be fixed as 16.4° that is an average of the upper limit $\theta_{max}=30.0°$ and the lower limit $\theta_{min}=2.8°$ in the case of the most off-axis of $\omega=\omega_{max}=18.1°$, irrespective of the half angle of view ω. As shown in FIG. 7, θ=16.4° is between the upper limit and the lower limit that are shown as the broken lines, that is, the conditional expression (1) is satisfied. Thus, with regard to any value of the angle of view ω, occurrence of a bright spot line image due to the microstructures 15 can be inhibited.

As described above, the microstructure reflection surface 5c is not limited to triangular prisms or trapezoidal prisms, and may be polyhedral reflecting surface prisms or curved reflecting surface prisms. In step with this, the reflecting surfaces 16 or 17 of the microstructures 15 may be polyhedral or curved surfaces.

In the case of triangular prisms as in the present embodiment or trapezoidal prisms, each of the reflecting surfaces 16 or 17 is formed of a single plane, and thus, the incline angle itself of each of the reflecting surfaces 16 or 17 is set as the incline angle θ.

On the other hand, when the reflecting surfaces 16 or 17 are polyhedral, an average of incline angles of the respective planes of the reflecting surfaces 16 or 17 taking into consideration of area ratios thereof may be set as the incline angle θ.

When the reflecting surfaces 16 or 17 are curved surfaces, the shape of the curved surface may be mathematized using a fitting function, and an average of incline angles calculated from inclinations determined by derivative values thereof may be set as the incline angle θ.

Figure 8:
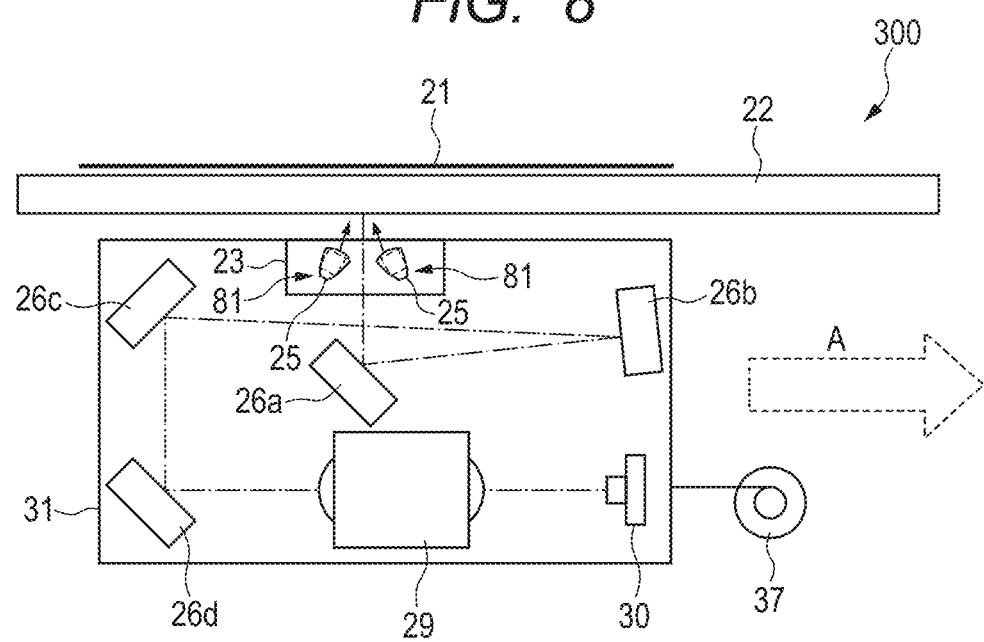
FIG. 8 is a schematic scanning sectional view of an image reading apparatus 300 having an illuminating device 23 mounted thereon according to a second embodiment of the present invention.

FIG. 8 is a schematic scanning sectional view of an image reading apparatus 300 having an illuminating device 23 mounted thereon according to a second embodiment of the present invention.

The image reading apparatus 300 includes an original table glass 22, an integral scanning optical system unit (hereinafter also referred to as "carriage") 31, and the main body 11.

The carriage 31 includes the illuminating device 23, a first reflection mirror 26a, a second reflection mirror 26b, a third reflection mirror 26c, a fourth reflection mirror 26d, an imaging lens (reduction optical system) 29, and a light receiving unit (line sensor) 30.

The illuminating device 23 illuminates an original 21 placed on the original table glass 22. The reflected light flux from the original 21 illuminated by the illuminating device 23 is folded back by the reflection mirrors 26a to 26d. The imaging lens 29 forms an image on the surface of the line sensor 30 using the light flux based on image information from the original 21.

The carriage 31 formed in this way scans in a direction shown by an arrow A (scanning direction) in the figure by a driving motor (scanning motor) 37 as a driving unit. At that time, the respective elements of the carriage 31 scan the original 21 without changing relative positional relationship thereamong.

The respective reflection mirrors are arranged so that the light flux reflected by the original 21 is folded back from the first reflection mirror 26a to the second reflection mirror 26b, from the second reflection mirror 26b to the third reflection mirror 26c, and then from the third reflection mirror 26c to the fourth reflection mirror 26d. The light flux from the original 21 that is folded back by the fourth reflection mirror 26d forms an image on the surface of the line sensor 30 through the reduction optical system 29.

The image information of the original 21 that is read by the line sensor 30 is sent as electric signals to an image processing unit (not shown), and is output after being subjected to predetermined signal processing. The image reading apparatus 300 further includes a power source unit (not shown) for driving the apparatus.

Next, the imaging lens 29 is described. In the present embodiment, differently from the case of the first embodiment, the imaging lens 29 is provided in the carriage 31. The carriage 31 is required to be downsized because the whole unit scans. Therefore, in order to reduce an optical path length from the original 21 to the line sensor 30, the imaging lens 29 is required to be a wide-angle one having a most off-axis half angle of view $\omega_{max}$ of 20° or more.

In the present embodiment, the resolution necessary for the reading is 600 dpi and the pixel pitch of the line sensor 30 is 4.7 μm. Thus, the imaging magnification β is determined to be −0.111.

Further, the maximum object height Y for reading an A3 sized original is 152.5 mm. A focal length f of the imaging lens 29 for satisfying a size and imaging performance of the image reading apparatus is 29.0 mm.

A most off-axis half angle of view $\omega_{max}$ of the imaging lens 29 is determined from a relationship:

$$\omega_{max}=\tan^{-1}(Y/((1-(1/\beta))\times f))$$

to be:

$$\tan^{-1}(152.5/((1-(1/(-0.111)))\times 29.0))=27.7°.$$

By using the wide-angle imaging lens 29 having the most off-axis half angle of view $\omega_{max}$ of 20° or more, the optical path length can be reduced. Specifically, the carriage 31 can be downsized, and further, the image reading apparatus 300 can be downsized as a whole.

Next, an illuminating unit 81 constructing the illuminating device 23 is described with reference to FIG. 9 to FIG. 11.

Figure 9:
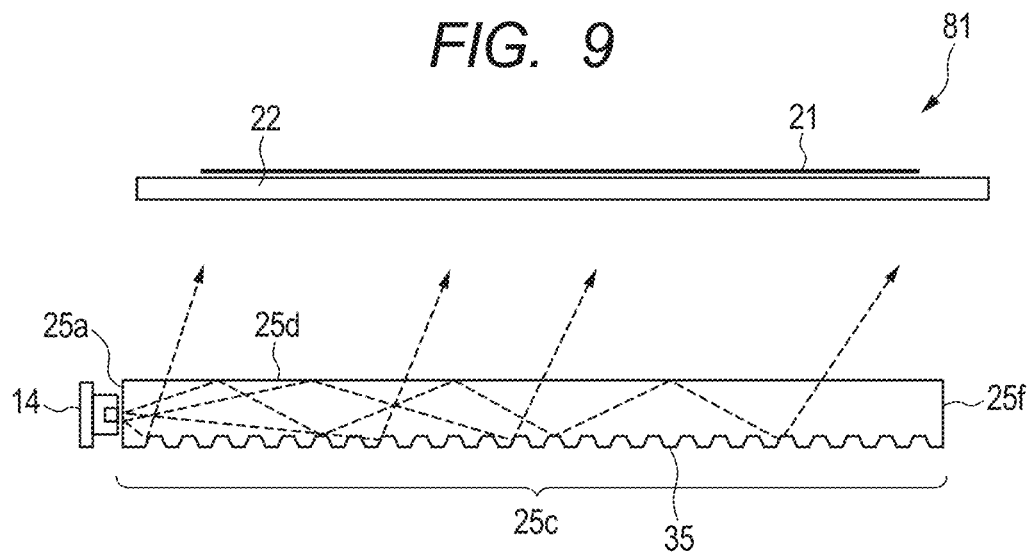
FIG. 9 is a longitudinal sectional view of an illuminating unit 81.

FIG. 9 is a longitudinal sectional view of the illuminating unit 81. FIG. 10 is a scanning sectional view of the illuminating unit 81. FIG. 11 is a perspective view illustrating a microstructure reflection surface 25c of a light guide 25.

As illustrated in FIG. 9, in the present embodiment, differently from the case of the first embodiment, the light source unit 14 is provided only at an end on one side of the illuminating unit 81, and only an end on the one side of the light guide 25 is an incident surface 25a of a light flux that exits from the light source unit 14. Further, an end diffusing surface 25f is provided at an end on another side of the light guide 25. Such a structure can reduce the number of LEDs as a light source to enable cost reduction. Further, by providing the light source unit only on the one side, the illuminating device 23 can be downsized in the longitudinal direction.

Note that, instead of the end diffusing surface 25f, an end reflecting surface may be provided at the end on the another side of the light guide 25. With the end diffusing surface or the end reflecting surface provided at the end on the another side, a light source unit may be assumed to be provided also at the end on the another side of the light guide 25. Assuming that the end on the another side is an incident surface of a light flux from another light source, the incline angle θ of the reflecting surfaces of the microstructure reflection surface opposed to the incident surface may be set similarly to the incline angle θ of the reflecting surfaces of the microstructure reflection surface opposed to the incident surface 25a.

Figure 11:
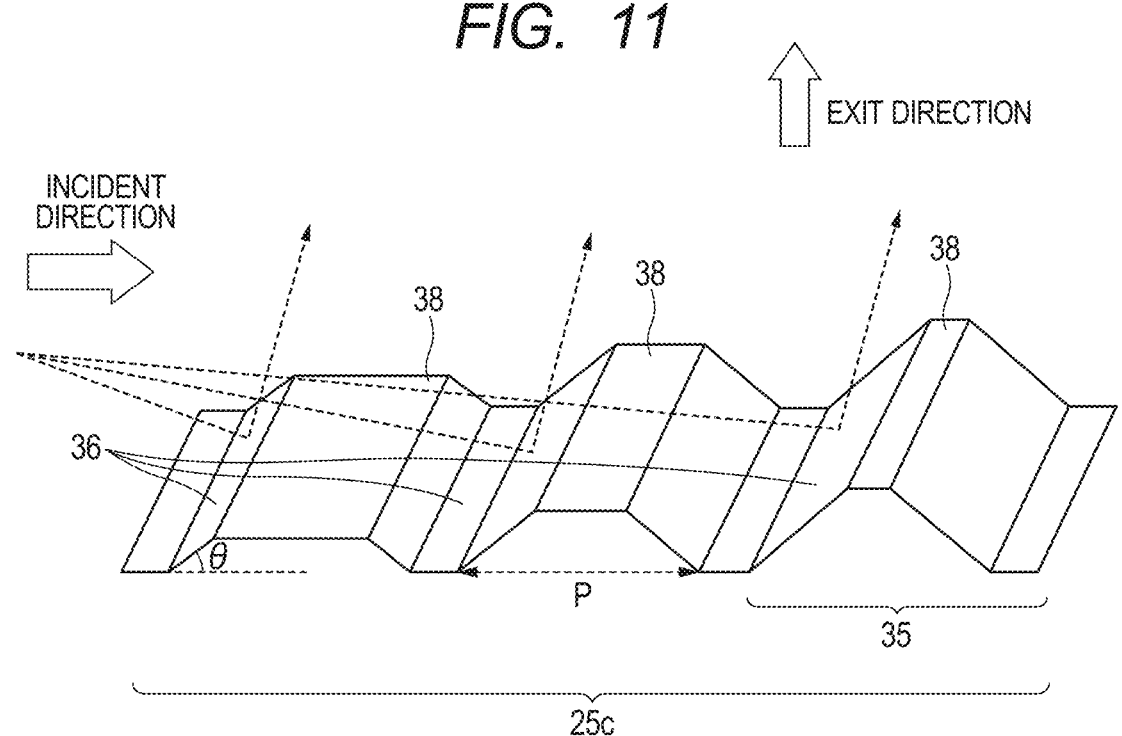
FIG. 11 is a perspective view illustrating a microstructure reflection surface 25c of a light guide 25.

Further, in the present embodiment, trapezoidal prisms as illustrated in FIG. 11 are adopted as the microstructure reflection surface 25c. In the present embodiment, the light source unit 14 is provided only on the one side, and thus, light propagating efficiency from the incident surface 25a to the end diffusing surface 25f is required to be high. Through usage of flat portions 38 of the trapezoidal prisms and a repeat of total reflection, light can propagate to the end diffusing surface 25f of the light guide 25 with efficiency.

Figure 10:
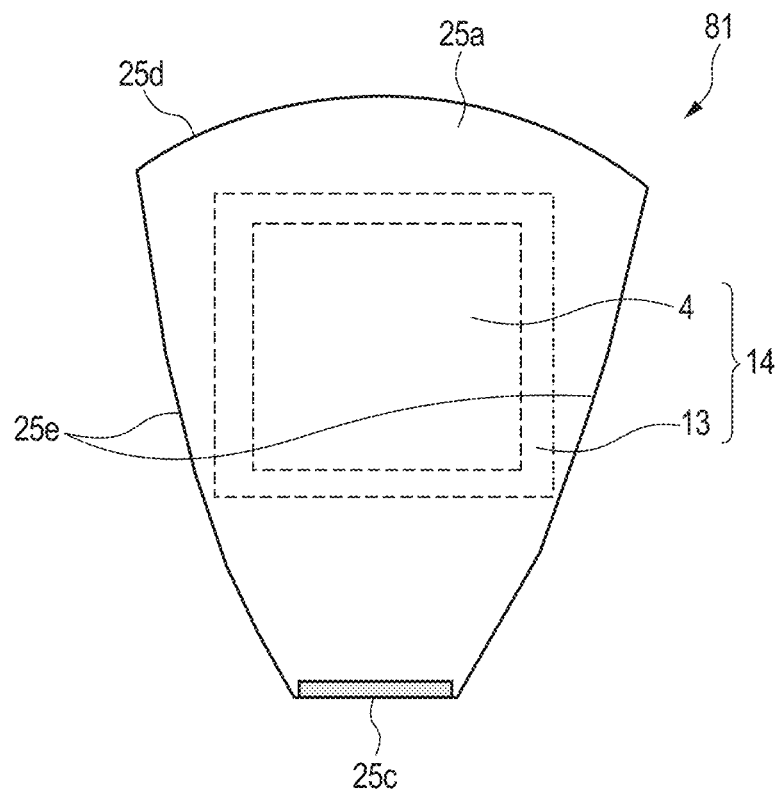
FIG. 10 is a scanning sectional view of the illuminating unit 81.

Further, as illustrated in FIG. 10, the light guide 25 in scanning section is, similarly to the case of the first embodiment, substantially in the shape of a fan. An exit surface 25d is in the shape of a curved surface having a light collecting effect. Further, total reflection side surfaces 25e that connect the exit surface 25d and the microstructure reflection surface 25c are in the shape of polyhedral surfaces.

In the present embodiment, surfaces of the light guide 25 are formed of five kinds of surfaces (six surfaces): the incident surface 25a; the microstructure reflection surface 25c; the exit surface 25d; the total reflection side surfaces 25e; and the end diffusing surface 25f, each of which is substantially planar, substantially paraboloidal, or substantially ellipsoidal. This structure eases manufacture of a mold for forming the light guide 25 and simplifies the shape of the light guide 25, and the light guide 25 still has an effect equivalent to that of the light guide 5 according to the first embodiment. Specifically, an adequate light amount for the original 21 can be secured, and a stable illuminated region in the scanning direction can be secured. The light guide 25 itself is in the shape of the scanning section extended in the longitudinal direction.

Note that, the light guide 25 is, similarly to the case of the first embodiment, formed of acrylic, in particular, polymethyl methacrylate (PMMA), and has a length in the longitudinal direction of 320 mm.

As illustrated in FIG. 9 to FIG. 11, the microstructure reflection surface 25c of the present embodiment is formed as trapezoidal prisms, and each of the trapezoidal prisms is elongated in the scanning direction.

Further, the pitch P in the longitudinal direction of microstructures 35 is set so as to, in order to set a more appropriate illuminance light amount distribution in the longitudinal direction, become smaller as the distance from the light source unit 14 becomes larger. Of course, similarly to the case of the first embodiment, the pitch P may be fixed at any place in the longitudinal direction.

Next, the incline angle θ of the microstructure reflection surface 25c is described in detail.

Figure 12:
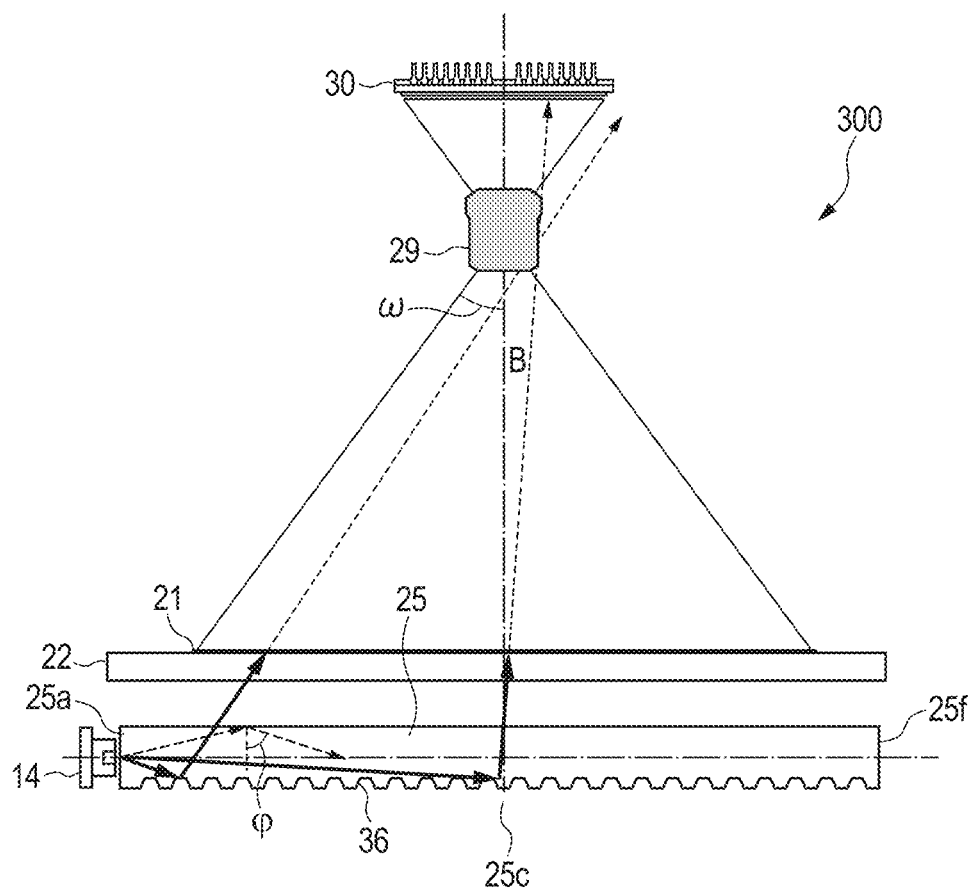
FIG. 12 is a developed view of optical paths in the image reading apparatus 300 according to the second embodiment of the present invention.

FIG. 12 is a developed view of optical paths in the image reading apparatus 300 according to the present embodiment.

In the present embodiment, similarly to the case of the first embodiment, the incline angle θ of reflecting surfaces 36 of the microstructures 35 is determined so that a light flux regularly reflected by the original 21 is prevented from passing through a pupil of the imaging lens 29.

This prevents regularly reflected light from forming an image on the line sensor 30, and thus, occurrence of a bright spot line image due to the microstructures 35 can be inhibited.

In the present embodiment, similarly to the case of the first embodiment, the incline angle θ may be set so as to satisfy the conditional expression (1). Note that, specific values in the present embodiment are ω=−27.7° to 27.7°, n=1.49 (acrylic is used), and φ=sin$^{-1}$(1/1.49)=42.2°.

Figure 13:
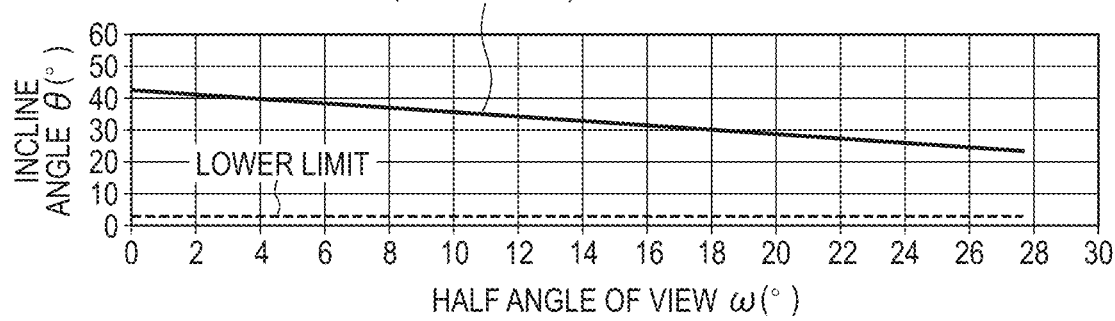
FIG. 13 is a graph showing a relationship between the incline angle $\theta$ and the half angle of view $\omega$ in the second embodiment of the present invention.

FIG. 13 is a graph showing a relationship between the incline angle θ and the half angle of view ω in the present embodiment.

In the range of 0≤ω≤ω$_{max}$, a lower limit of the conditional expression (1) is determined as θ$_{min}$=45−42.2=2.8°. When θ<θ$_{min}$, the condition of total reflection in the light guide 25 is satisfied, and thus, the light flux cannot exit from the exit surface 25d.

Further, it is preferred that the lower limit θ$_{min}$ be 10° or more. The reason is that, in order to set an appropriate illuminance light amount distribution in the longitudinal direction, when maximum intensity is normalized as one from radiation angle characteristics of the LED, it is desired to make the distribution with light having intensity of 0.4 or more. From the radiation angle necessary for the intensity of 0.4 or more, the incline angle θ is determined to be 10° or more.

On the other hand, in the range of 0≤ω≤ω$_{max}$, an upper limit of the conditional expression (1) is calculated as θ$_{max}$=42.2−(27.7/1.49)=23.6° in the case of a most off-axis of ω=ω$_{max}$=27.7°, and is calculated as θ$_{max}$=42.2−(0/1.49)=42.2° in the case of an on-axis of ω=0°. When θ>θ$_{max}$, a regularly reflected light flux comes in the pupil of the imaging lens 29, and thus, a bright spot line image due to the microstructures 35 occurs.

In FIG. 13, the upper limit and the lower limit described above are shown as broken lines. In the present embodiment, as shown as a solid line in FIG. 13, the incline angle θ of the reflecting surfaces 36 of the microstructures 35 is set so as to change in the longitudinal direction between the upper limit θ$_{max}$=23.6° in the case of the half angle of view of ω=ω$_{max}$=27.7° and the upper limit θ$_{max}$=42.2° in the case of ω=0°. Specifically, a line of the upper limit shown in FIG. 13 is set to be the incline angle θ (the broken line showing the upper limit overlaps with the solid line).

In this way, an exit angle of a light flux from the light guide 25 changes, and thus, flexibility in controlling the illuminance distribution in the longitudinal direction of the light guide 25 increases. Thus, an appropriate distribution can be set.

Further, the incline angle θ satisfies the conditional expression (1), and thus, with regard to any value of the angle of view ω, occurrence of a bright spot line image due to the microstructures 35 can be inhibited.

Figure 14:
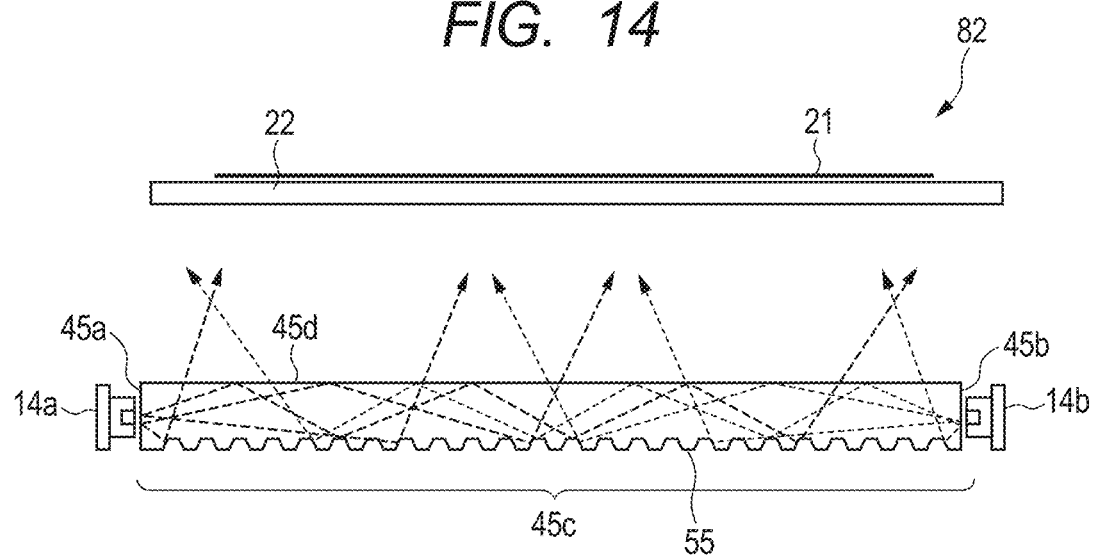
FIG. 14 is a longitudinal sectional view of an illuminating unit 82 provided in an illuminating device 91 mounted on an image reading apparatus 400 according to a third embodiment of the present invention.
Figure 15:
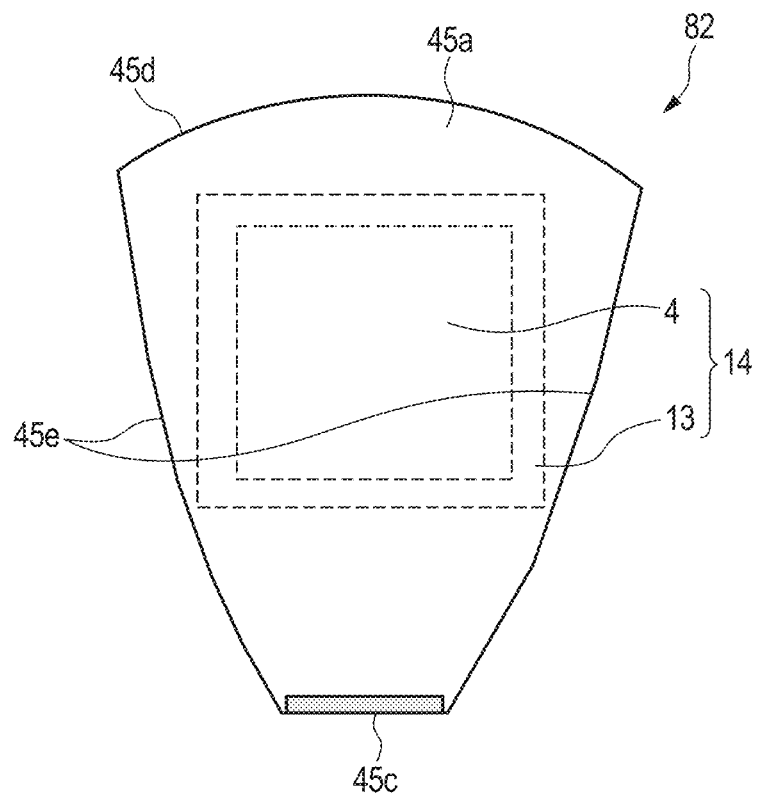
FIG. 15 is a scanning sectional view of the illuminating unit 82.

FIG. 14 is a longitudinal sectional view of an illuminating unit 82 provided in an illuminating device 91 mounted on an image reading apparatus 400 according to a third embodiment of the present invention. FIG. 15 is a scanning sectional view of the illuminating unit 82, and FIG. 16 is a perspective view illustrating a microstructure reflection surface 45c of a light guide 45.

Note that, a structure of the image reading apparatus 400 according to the present embodiment is similar to that of the image reading apparatus 300 according to the second embodiment. Thus, like reference symbols are used to designate like components, and description thereof is omitted. Further, a structure of the illuminating device 91 according to the present embodiment is similar to those of the illuminating device 3 according to the first embodiment and the illuminating device 23 according to the second embodiment. Thus, like reference symbols are used to designate like components, and description thereof is omitted. Further, as illustrated in FIG. 15, the light guide 45 in scanning section is in a shape similar to that of the light guide 25 according to the second embodiment.

As illustrated in FIG. 14, in the present embodiment, similarly to the case of the first embodiment, light source units 14a and 14b are provided at both ends, respectively, of the illuminating unit 82. Incident surfaces 45a and 45b into which light fluxes that exit from the light source units 14a and 14b enter are provided at both ends of the light guide 45, respectively. This structure uses the two light source units 14a and 14b, and thus, compared with the illuminating unit 81 of the second embodiment, a light amount radiated to the surface of original can be increased. Therefore, in the image reading apparatus 400, reading speed of the original can be increased and an S/N ratio in reading can be increased, which enable further improvement in performance.

Figure 16:
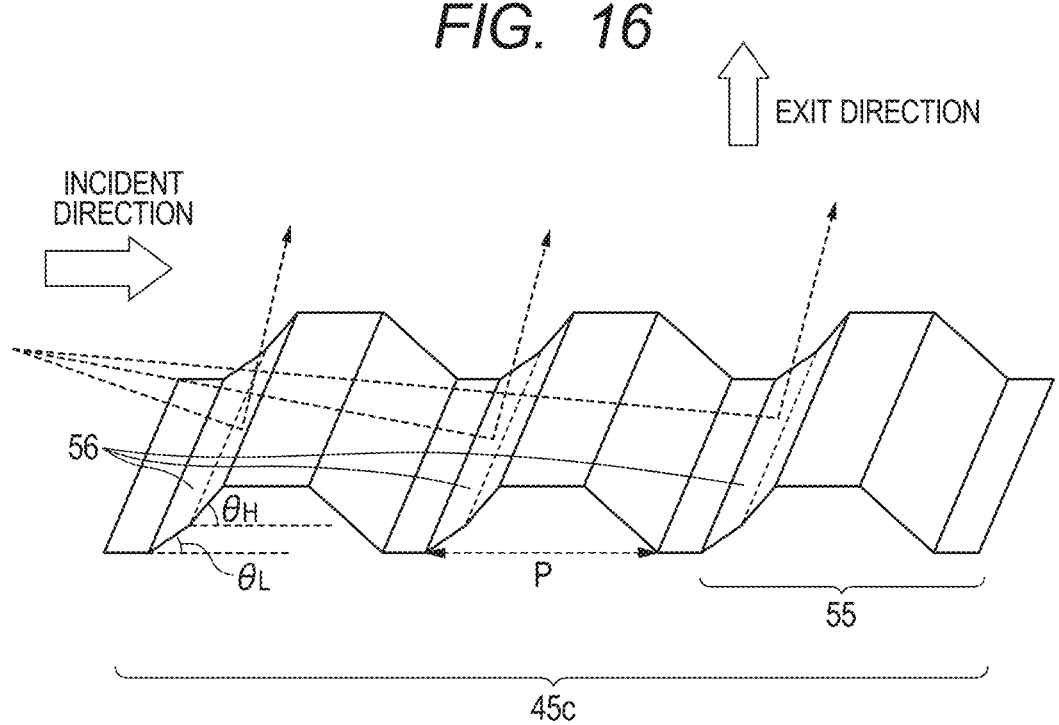
FIG. 16 is a perspective view illustrating a microstructure reflection surface 45c of a light guide 45.

Further, in the present embodiment, as illustrated in FIG. 16, as the microstructure reflection surface 45c, polyhedral reflecting surface substantially trapezoidal prism shapes are adopted in which a reflecting surface 56 of each of microstructures 55 includes two surfaces. By forming the microstructure reflection surface 45c into a shape of substantially trapezoidal prisms, there is an effect that the light fluxes can easily propagate in the longitudinal direction. Further, by forming the reflecting surfaces 56 as polyhedral reflecting surfaces, a reflection angle of the light flux has flexibility, and thus, the illuminance distribution in the longitudinal direction of the light guide 45 can be appropriately set.

Differently from the cases of the first and second embodiments, the light guide 45 of the present embodiment is formed of polycarbonate (PC). PC is more flame proof and more heat resistant than polymethyl methacrylate (PMMA), and thus, as in the present embodiment, is less influenced by heat from the two light source units 14a and 14b provided at both the ends of the light guide 45. Note that, the light guide 45 has a length in the longitudinal direction of 320 mm.

As illustrated in FIG. 14 to FIG. 16, the microstructure reflection surface 45c of the present embodiment is formed as polyhedral reflecting surface substantially trapezoidal prisms in which each of the reflecting surfaces 56 includes two surfaces, and each of the polyhedral reflecting surface substantially trapezoidal prisms is elongated in the scanning direction.

Further, the pitch P in the longitudinal direction of the microstructures 55 is, similarly to the case of the first embodiment, set so as to be fixed at any place in the longitudinal direction. Of course, in order to set a more appropriate illuminance light amount distribution in the longitudinal direction, the pitch P may be set so as to become smaller as a distance from the light source units 14a and 14b becomes larger.

Next, an incline angle θ of the microstructure reflection surface 45c is described in detail.

In the present embodiment, similarly to the cases of the first and second embodiments, the incline angle θ of the reflecting surfaces 56 of the microstructures 55 is determined so as to prevent a light flux regularly reflected by the original 21 from passing through a pupil of the imaging lens 29.

This prevents regularly reflected light from forming an image on the line sensor 30, and thus, occurrence of a bright spot line image due to the microstructures 55 can be inhibited.

In the present embodiment, similarly to the cases of the first and second embodiments, the incline angle θ may be set so as to satisfy the conditional expression (1). Note that, specific values in the present embodiment are ω=−27.7° to 27.7°, n=1.59 (polycarbonate is used), and φ=sin$^{-1}$(1/1.59)=39.0°.

Figure 17:
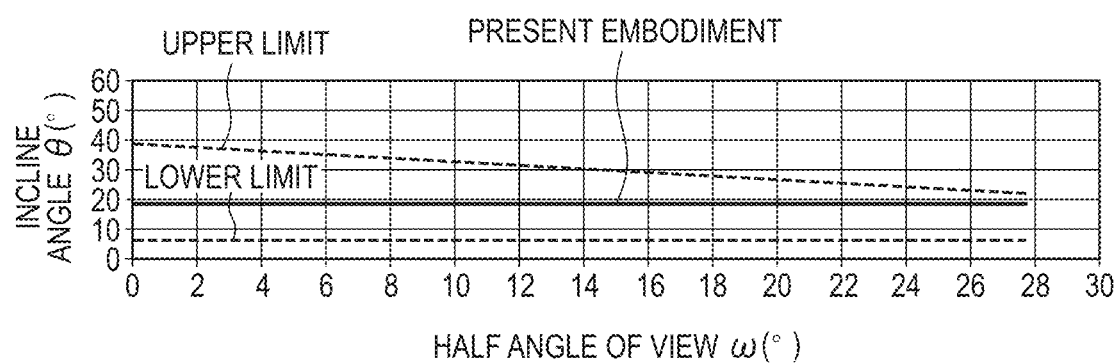
FIG. 17 is a graph showing a relationship between the incline angle $\theta$ and the half angle of view $\omega$ in the third embodiment of the present invention.

FIG. 17 is a graph showing a relationship between the incline angle θ and the half angle of view ω in the present embodiment.

In the range of $0 \leq \omega \leq \omega_{max}$, a lower limit of the conditional expression (1) is determined as $\theta_{min}=45-39.0=6.0°$. When $\theta<\theta_{min}$, the condition of total reflection in the light guide 45 is satisfied, and thus, the light flux cannot exit from the exit surface 45d.

Further, it is preferred that the lower limit $\theta_{min}$ be 15° or more. The reason is that, in order to set an appropriate illuminance light amount distribution in the longitudinal direction, when maximum intensity is normalized as one from radiation angle characteristics of the LED, it is desired to make the distribution with light having intensity of 0.4 or more. From the radiation angle necessary for the intensity of 0.4 or more, the incline angle θ is determined to be 15° or more.

On the other hand, in the range of $0 \leq \omega \leq \omega_{max}$, an upper limit of the conditional expression (1) is calculated as $\theta_{max}=38.9-(27.7/1.59)=21.5°$ in the case of a most off-axis of $\omega=\omega_{max}=27.7°$, and is calculated as $\theta_{max}=38.9-(0/1.59)=38.9°$ in the case of an on-axis of $\omega=0°$. When $\theta>\theta_{max}$, a regularly reflected light flux comes in the pupil of the imaging lens 29, and thus, a bright spot line image due to the microstructures 55 occurs.

In FIG. 17, the upper limit and the lower limit described above are shown as broken lines. In the present embodiment, as shown as a solid line in FIG. 17, the incline angle θ is set to be fixed as θ=18.5° that is equal to or smaller than the upper limit $\theta_{max}=21.5°$ determined from the most off-axis half angle of view $\omega=\omega_{max}=27.7°$.

From this, a ratio between areas of the two reflecting surfaces is set to be 1:1, and incline angles of the reflecting surfaces are set to be $\theta_L=16°$ and $\theta_H=21°$, respectively.

As shown in FIG. 17, θ=18.5° is between the upper limit and the lower limit that are shown as the broken lines, that is, the conditional expression (1) is satisfied. Thus, with regard to any value of the angle of view ω, occurrence of a bright spot line image due to the microstructures 55 can be inhibited.

Figure 18:
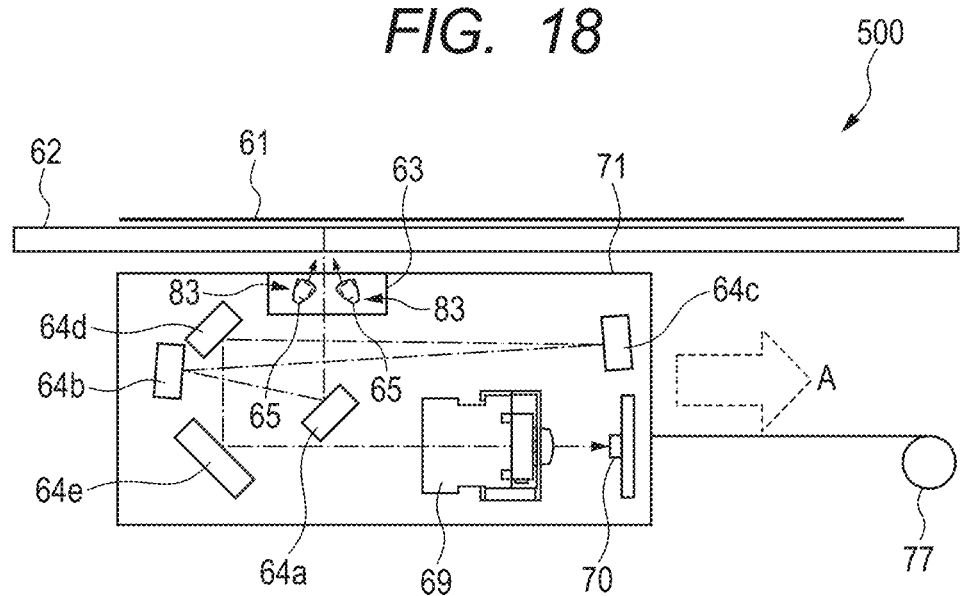
FIG. 18 is a schematic scanning sectional view of an image reading apparatus 500 having an illuminating device 63 mounted thereon according to a fourth embodiment of the present invention.

FIG. 18 is a schematic scanning sectional view of an image reading apparatus 500 having an illuminating device 63 mounted thereon according to a fourth embodiment of the present invention.

The image reading apparatus 500 includes an original table glass 62, a carriage 71, and the main body 11. The carriage 71 includes the illuminating device 63, a first reflection mirror 64a, a second reflection mirror 64b, a third reflection mirror 64c, a fourth reflection mirror 64d, a fifth reflection mirror 64e, an imaging lens (reduction optical system) 69, and a light receiving unit (line sensor) 70.

The illuminating device 63 illuminates an original 61 placed on the original table glass 62. The reflected light flux from the original 61 illuminated by the illuminating device 63 is folded back by the reflection mirrors 64a to 64e. The imaging lens 69 forms an image on the surface of the line sensor 70 using the light flux based on image information from the original 61.

The carriage 71 formed in this way moves in a direction shown by an arrow A (scanning direction) in the figure by a driving motor (scanning motor) 77 as a driving unit, to thereby scan the surface of the original 61. At that time, the respective elements of the carriage 71 scan the original 61 without changing relative positional relationship thereamong.

The respective reflection mirrors are arranged so that the light flux reflected by the original 61 is folded back from the first reflection mirror 64a to the second reflection mirror 64b, from the second reflection mirror 64b to the third reflection mirror 64c, and then from the third reflection mirror 64c to the fourth reflection mirror 64d. After that, the reflected light flux is folded back from the fourth reflection mirror 64d to the fifth reflection mirror 64e, and the light flux that is folded back by the fifth reflection mirror 64e forms an image on the surface of the line sensor 70 through the reduction optical system 69.

The image information of the original 61 that is read by the line sensor 70 is sent as electric signals to an image processing unit (not shown), and is output after being subjected to predetermined signal processing. The image reading apparatus 500 further includes a power source unit (not shown) for driving the apparatus.

In the imaging lens 69 of the present embodiment, because the resolution necessary for the reading is 1,200 dpi and the pixel pitch of the line sensor 70 is 4 μm, the imaging magnification β is determined to be −0.189.

Further, the maximum object height Y necessary for reading an A4 sized original is 108.0 mm. A focal length f of the imaging lens 69 for satisfying a size and imaging performance of the image reading apparatus is 32.8 mm.

A most off-axis half angle of view $\omega_{max}$ of the imaging lens 69 is determined to be:

$$\tan^{-1}(108.0/((1-(1/(-0.189)))\times 32.8))=27.6°.$$

By using the wide-angle imaging lens 69 having the most off-axis half angle of view $\omega_{max}$ of 20° or more, the optical path length can be reduced. Specifically, the carriage 71 can be downsized, and further, the image reading apparatus 500 can be downsized as a whole.

Next, the illuminating unit 83 constructing the illuminating device 63 is described with reference to FIG. 19 to FIG. 21.

Figure 19:
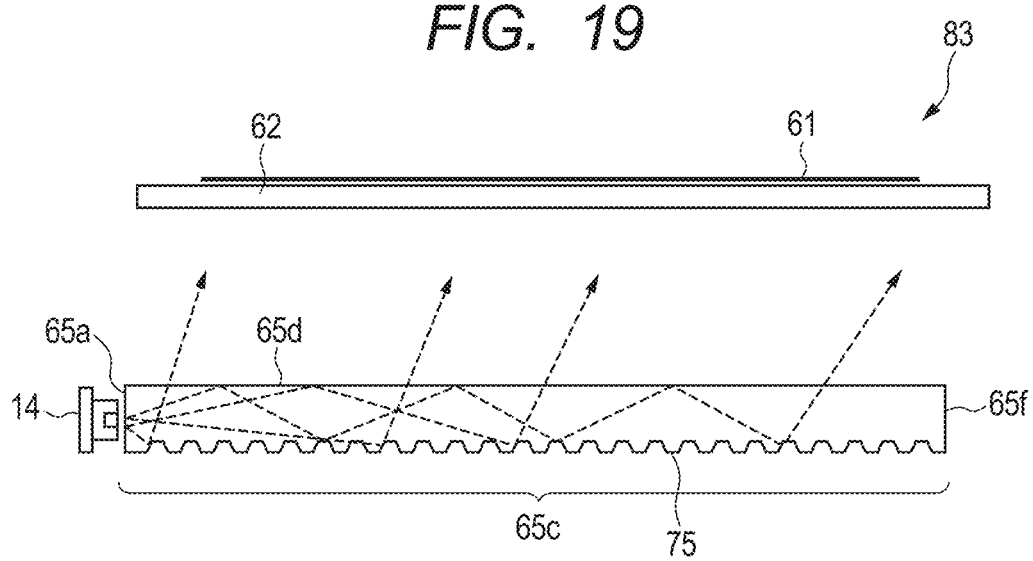
FIG. 19 is a longitudinal sectional view of an illuminating unit 83.

FIG. 19 is a longitudinal sectional view of the illuminating unit 83. FIG. 20 is a scanning sectional view of the illuminating unit 83. FIG. 21 is a perspective view illustrating a microstructure reflection surface 65c of a light guide 65.

As illustrated in FIG. 19, in the present embodiment, similarly to the case of the second embodiment, the light source unit 14 is provided only at an end on one side of the illuminating unit 83, and only an end on the one side of the light guide 65 is an incident surface 65a of a light flux that exits from the light source unit 14. Further, an end diffusing surface (or a reflecting surface) 65f is provided at an end on another side of the light guide 65. Such a structure can reduce the number of LEDs as a light source to enable cost reduction. Further, by providing the light source unit only on the one side, the illuminating device 63 can be downsized in the longitudinal direction.

Figure 21:
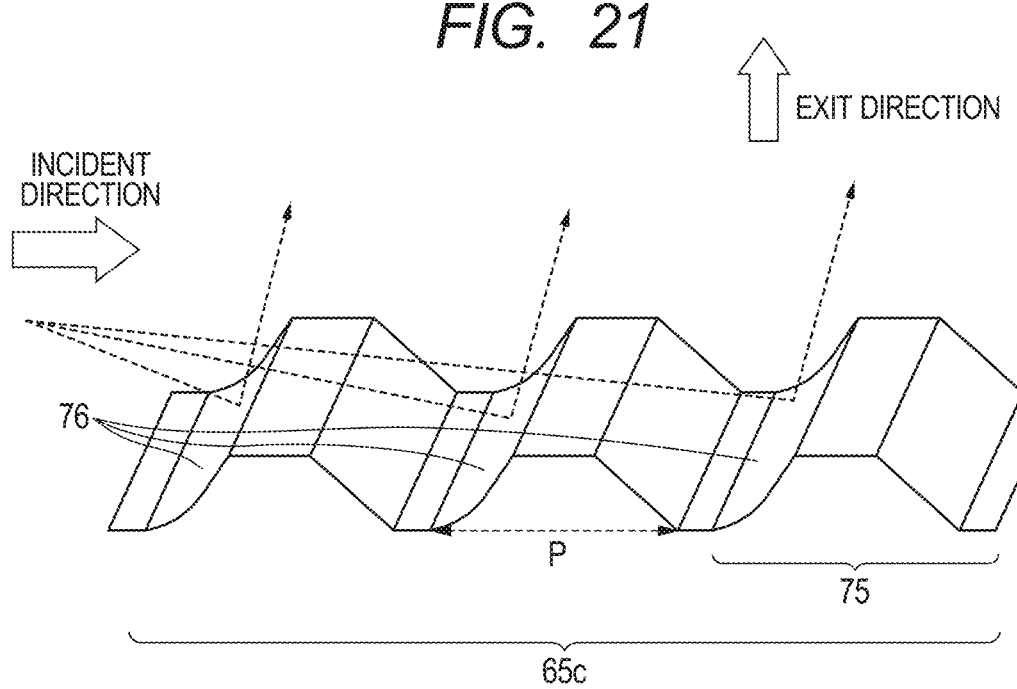
FIG. 21 is a perspective view illustrating a microstructure reflection surface 65c of a light guide 65.

Further, in the present embodiment, as illustrated in FIG. 21, as the microstructure reflection surface 65c, curved reflecting surface substantially trapezoidal prism shapes are adopted in which a reflecting surface 76 of each of microstructures 75 is a curved surface. By forming the microstructure reflection surface 65c into a shape of substantially trapezoidal prisms, there is an effect that the light flux can easily propagate in the longitudinal direction. Further, by forming the reflecting surfaces 76 as curved reflecting surfaces, a reflection angle of the light flux has flexibility. Thus, the illuminance distribution in the longitudinal direction of the light guide 65 can be appropriately set.

Figure 20:
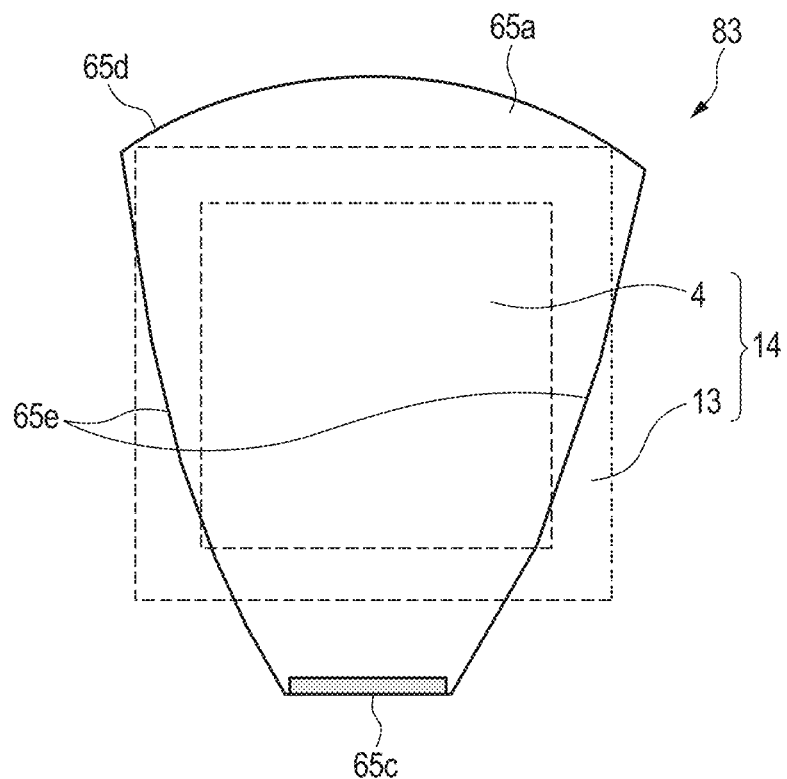
FIG. 20 is a scanning sectional view of the illuminating unit 83.

Further, as illustrated in FIG. 20, the light guide 65 in scanning section is, similarly to the case of the first embodiment, substantially in the shape of a fan. An exit surface 65d and total reflection side surfaces 65e that connect the exit surface 65d and the microstructure reflection surface 65c are, similarly to the case of the second embodiment, in the shape of polyhedral surfaces. The light guide 65 itself is in the shape of the scanning section extended in the longitudinal direction.

Note that, the light guide 65, is similarly to the case of the first embodiment, formed of acrylic, in particular, polymethyl methacrylate (PMMA), and has a length in the longitudinal direction of 240 mm.

As illustrated in FIG. 19 to FIG. 21, the microstructure reflection surface 65c of the present embodiment is formed as curved reflecting surface substantially trapezoidal prisms in which each of the reflecting surfaces 76 is a curved surface, and each of the curved reflecting surface substantially trapezoidal prisms is elongated in the scanning direction.

Further, the pitch P in the longitudinal direction of the microstructures 75 is, similarly to the case of the first embodiment, set so as to be fixed at any place in the longitudinal direction. Of course, in order to set a more appropriate illuminance light amount distribution in the longitudinal direction, the pitch P may be set so as to become smaller as the distance from the light source unit 14 becomes larger.

Next, an incline angle θ of the microstructure reflection surface 65c is described in detail.

In the present embodiment, similarly to the cases of the first to third embodiments, the incline angle θ of reflecting surfaces 76 of the microstructures 75 is determined so as to prevent a light flux regularly reflected by the original 61 from passing through a pupil of the imaging lens 69.

This prevents regularly reflected light from forming an image on the line sensor 70, and thus, occurrence of a bright spot line image due to the microstructures 75 can be inhibited.

In the present embodiment, similarly to the cases of the first to third embodiments, the incline angle θ may be set so as to satisfy the conditional expression (1). Note that, specific values in the present embodiment are ω=−27.6° to 27.6°, n=1.49 (acrylic is used), and φ=$\sin^{-1}$ (1/1.49)=42.2°.

Figure 22:
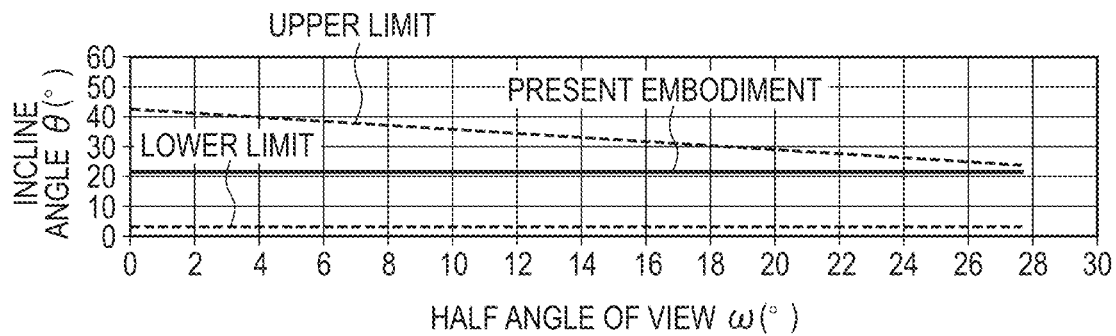
FIG. 22 is a graph showing a relationship between the incline angle θ and the half angle of view ω in the fourth embodiment of the present invention.

FIG. 22 is a graph showing a relationship between the incline angle θ and the half angle of view ω in the present embodiment.

In the range of $0 \leq \omega \leq \omega_{max}$, a lower limit of the conditional expression (1) is determined as $\theta_{min}$=45−42.2=2.8°. When $\theta < \theta_{min}$, the condition of total reflection in the light guide 65 is satisfied, and thus, the light flux cannot exit from the exit surface 65d.

Further, it is preferred that the lower limit $\theta_{min}$ be 10° or more. The reason is that, in order to set an appropriate illuminance light amount distribution in the longitudinal direction, when maximum intensity is normalized as one from radiation angle characteristics of the LED, it is desired to make the distribution with light having intensity of 0.4 or more. From the radiation angle necessary for the intensity of 0.4 or more, the incline angle θ is determined to be 10° or more.

On the other hand, in the range of $0 \leq \omega \leq \omega_{max}$, an upper limit of the conditional expression (1) is calculated as $\theta_{max}$=42.2−(27.6/1.49)=23.7° in the case of a most off-axis of $\omega = \omega_{max}$=27.6°, and is calculated as $\theta_{max}$=42.2−(0/1.49)=42.2° in the case of an on-axis of ω=0°. When $\theta > \theta_{max}$, a regularly reflected light flux comes in the pupil of the imaging lens 69, and thus, a bright spot line image due to the microstructures 75 occurs.

In FIG. 22, the upper limit and the lower limit described above are shown as broken lines. In the present embodiment, as shown as a solid line in FIG. 22, the incline angle θ is set to be fixed as θ=21.0° that is equal to or smaller than the upper limit $\theta_{max}$=23.7° and that is equal to or larger than the lower limit $\theta_{min}$=2.8° that are determined from the most off-axis half angle of view of $\omega = \omega_{max}$=27.6°.

From this, each of the reflecting surfaces 76 is set to be in the shape of a curved surface of R=0.16 mm under a state in which an air layer side is convex.

As shown in FIG. 22, θ=21.0° is between the upper limit and the lower limit that are shown as the broken lines, that is, the conditional expression (1) is satisfied. Thus, with regard to any value of the angle of view ω, occurrence of a bright spot line image due to the microstructures 75 can be inhibited.

According to one embodiment of the present invention, the image reading apparatus can inhibit occurrence of a bright spot line image due to microstructures of a light guide and can obtain a high quality read image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image reading apparatus, comprising:
   an illumination unit comprising a light source and a light guide for guiding a light flux from the light source to a surface of an original, the light guide being elongated in a first direction; and
   an imaging unit for collecting a light flux from the surface of the original,
   wherein the light guide comprises:
      an incident surface provided on an end surface in the first direction, the light flux from the light source entering the incident surface;
      an exit surface from which a light flux from the incident surface exits, the exit surface being elongated in the first direction; and
      a light guide surface opposed to the exit surface, for guiding the light flux from the incident surface to the exit surface,
   wherein the light guide surface comprises a plurality of prisms each having a reflecting surface opposed to the incident surface, and
   wherein the following conditions are satisfied:

$45 - \phi \leq \theta \leq \phi - \omega/n$ $(0 \leq \omega \leq \omega_{max})$; and $45 - \phi \leq \theta \leq \phi$ $(-\omega_{max} \leq \omega \leq 0)$, where, within a section including the first direction and a directional perpendicular to the surface of the original, θ is an angle (deg.) between the original surface and the reflecting surface, ω is a half angle of view (deg.) of the imaging unit, $\omega_{max}$ ($\omega_{max} > 0$) is a maximum value (deg.) of the half angle of view of the imaging unit on the light source side with respect to a reading optical axis of the imaging unit, $-\omega_{max}$ is a maximum value (deg.) of the half angle of view of the imaging unit on a side opposite to the light source with respect to the reading optical axis, n is a refractive index of the light guide, and $\phi = \sin^{-1}(1/n)$.

2. An image reading apparatus according to claim 1, wherein $\omega_{max}$ is 20° or more.

3. An image reading apparatus according to claim 1, wherein the angle θ changes so as to become smaller as the half angle of view ω of the imaging unit becomes larger.

4. An image reading apparatus according to claim 1, wherein the plurality of prisms are triangular.

5. An image reading apparatus according to claim 1, wherein the plurality of prisms are trapezoidal.

6. An image reading apparatus according to claim 1, wherein the plurality of prisms comprise polyhedral reflecting surface prisms, wherein the reflecting surface of each is polyhedral.

7. An image reading apparatus according to claim 1, wherein the plurality of prisms comprise curved reflecting surface prisms, wherein the reflecting surface of each is curved.

8. An image reading apparatus according to claim 1, wherein the light guide comprises the incident surface on one end surface in the first direction and an end diffusing surface on another end surface in the first direction.

9. An image reading apparatus according to claim 1, wherein the light guide comprises the incident surface on one end surface in the first direction and an end reflecting surface on another end surface in the first direction.

10. An image reading apparatus according to claim 1, wherein the light guide comprises a transparent member having a refractive index n of 1.4 to 1.9.

11. An image reading apparatus according to claim 10, wherein the light guide is formed of one of polymethyl methacrylate and polycarbonate.

12. An image reading apparatus according to claim 1, wherein the illumination unit comprises two illuminating units arranged on both sides of the reading optical axis of the imaging unit so as to illuminate the surface of the original from both the sides of the reading optical axis.

13. An image reading apparatus, comprising:
an illumination unit comprising a first light source, a second light source and a light guide for guiding a light flux from the first light source and the second light source to a surface of an original, the light guide being elongated in a first direction; and
an imaging unit for collecting a light flux from the surface of the original,
wherein the light guide comprises:
a first incident surface provided on one end surface in the first direction, the light flux from the first light source entering the first incident surface;
a second incident surface that is provided on another end surface in the first direction, the light flux from the second light source entering the second incident surface;
an exit surface from which light fluxes from the first incident surface and the second incident surface exit, the exit surface being elongated in the first direction; and
a light guide surface opposed to the exit surface, for guiding the light fluxes from the first incident surface and the second incident surface to the exit surface,
wherein the light guide surface comprises a plurality of prisms each having a first reflecting surface opposed to the first incident surface and a second reflecting surface opposed to the second incident surface, and
wherein the following conditions are satisfied:

$$45-\phi \leq \theta 1 \leq \phi-\omega/n \ (0 \leq \omega \leq \omega_{max});$$

$$45-\phi \leq \theta 1 \leq \phi \ (-\omega_{max} \leq \omega \leq 0);$$

$$45-\phi \leq \theta 2 \leq \phi+\omega/n \ (-\omega_{max} \leq \omega \leq 0); \text{ and}$$

$$45-\phi \leq \theta 2 \leq \phi \ (0 \leq \omega \leq \omega_{max}),$$

where, within a section including the first direction and a direction perpendicular to the surface of the original, $\theta 1$ is an angle (deg.) between the surface of the original and the first reflecting surface, $\theta 2$ is an angle (deg.) between the surface of the original and the second reflecting surface, $\omega$ is a half angle of view (deg.) of the imaging unit, $\omega_{max}$ ($\omega_{max} > 0$) is a maximum value (deg.) of the half angle of view of the imaging unit on the first light source side with respect to the reading optical axis of the imaging unit, $-\omega_{max}$ is a maximum value (deg.) of the half angle of view of the imaging unit on the side opposite to the first light source with respect to the reading optical axis, n is a refractive index of the light guide, and $\phi=\sin^{-1}(1/n)$.

14. An image reading apparatus according to claim 13, wherein the angle $\theta 1$ and the angle $\theta 2$ change so as to become smaller as the half angle of view $\omega$ of the imaging unit becomes larger.

* * * * *